US007397437B2

(12) United States Patent
Hasumi et al.

(10) Patent No.: US 7,397,437 B2
(45) Date of Patent: Jul. 8, 2008

(54) BAND COUPLING STRUCTURE INCORPORATING CONDUCTIVE WIRES

(75) Inventors: Yuichi Hasumi, Nishitokyo (JP); Shigeru Futakami, Nishitokyo (JP); Nobuto Fukushima, Nishitokyo (JP); Taisuke Ienaga, Nishitokyo (JP)

(73) Assignee: Citizen Holdings Co., Ltd., Tokyo (JP)

( * ) Notice: Subject to any disclaimer, the term of this patent is extended or adjusted under 35 U.S.C. 154(b) by 6 days.

(21) Appl. No.: 11/390,694

(22) Filed: Mar. 28, 2006

(65) Prior Publication Data

US 2006/0217165 A1 Sep. 28, 2006

(30) Foreign Application Priority Data

Mar. 28, 2005 (JP) ............................. 2005-091877

(51) Int. Cl.
*H01Q 1/12* (2006.01)
*A44C 5/00* (2006.01)
*G04B 37/00* (2006.01)
*H04M 1/00* (2006.01)

(52) U.S. Cl. ....................... 343/718; 368/281; 368/282; 455/575.1; 455/575.7

(58) Field of Classification Search ................. 343/718; 368/10, 13, 14, 276, 281, 282, 278; 439/37; 455/575.1, 575.6, 575.7, 556.1
See application file for complete search history.

(56) References Cited

U.S. PATENT DOCUMENTS

| | | | | |
|---|---|---|---|---|
| 4,690,567 | A * | 9/1987 | Rebeaud | 368/203 |
| 4,754,285 | A * | 6/1988 | Robitaille | 343/718 |
| 4,977,614 | A * | 12/1990 | Kurcbart | 455/193.1 |
| 5,179,733 | A * | 1/1993 | Matsui | 455/344 |
| 5,280,296 | A * | 1/1994 | Tan et al. | 343/718 |
| 5,303,421 | A * | 4/1994 | Goldenberg | 455/344 |
| 5,450,091 | A * | 9/1995 | Hama | 343/718 |
| 5,742,256 | A * | 4/1998 | Wakabayashi | 343/718 |
| 6,175,729 | B1 * | 1/2001 | He et al. | 455/344 |
| 6,350,055 | B1 * | 2/2002 | Barras | 368/281 |
| 7,126,550 | B2 * | 10/2006 | Clerc et al. | 343/718 |

FOREIGN PATENT DOCUMENTS

JP 05-183454 A 7/1993

* cited by examiner

*Primary Examiner*—Hoang V Nguyen
*Assistant Examiner*—Robert Karacsony
(74) *Attorney, Agent, or Firm*—The Webb Law Firm, P.C.

(57) ABSTRACT

A band coupling structure incorporating conductive wires, in the case in which the bands are coupled with each other, the edge portion of the connection pin is abutted to and electrically connected to the connection pin fitting section, and one coupling part and another coupling part of the band coupling section can rotate to each other in the width direction of the bands on the axis of the band coupling section by locking the band coupling lock pin with the lock pin locking section.

10 Claims, 13 Drawing Sheets

PRIOR ART

BAND COUPLING STRUCTURE INCORPORATING CONDUCTIVE WIRES

BACKGROUND OF THE INVENTION

1. Field of the Invention

The present invention relates to a band coupling structure incorporating conductive wires used for portable compact information terminals that receive many kinds of information by utilizing radio waves, such as a radio controlled wristwatch, a wristwatch-type pager, a portable telephone, a portable television, and a portable radio.

2. Description of the Related Art

An electronic watch that receives standard radio waves, that is a radio watch that receives standard radio waves (carrier waves) including time information and that indicates accurate time by extracting time information from the radio waves, has already been known.

In addition, a wristwatch-type radio receiver that calls with radio or that exchanges information by receiving/transmitting electronic data has also already been known. Such a radio watch and a wristwatch-type radio receiver, in which an antenna (conductive wire) configuring a receiving section is enclosed in a main body case or a wrist band, have already been put on the market.

However, in the case in which an antenna is enclosed in a main body case made of conductive material such as metal, a magnetic flux generated around the antenna is absorbed in the conductive material and a resonance phenomenon is prevented. As a result, the receiving function of the antenna is greatly deteriorated to the degree that the antenna cannot receive the standard radio waves.

For some radio watches, a proposal has been made to prevent the receiving function of the antenna from being deteriorated even if a main body case made of conductive material is used. For some wristwatch-type radio receivers, however, an antenna may be enclosed in a wrist band to satisfy desired antenna characteristics such as a gain.

That is to say, the opening area of an antenna is enlarged to improve an antenna gain. In general, a frequency of radio waves to be received for a wristwatch-type radio receiver is higher than that for a radio controlled wristwatch. For instance, a frequency of radio waves that are used by a radio watch is in the range of 40 to 60 kHz. On the other hand, a frequency of radio waves that are used by a wristwatch-type pager, which is one of wristwatch-type radio receivers, is in the range of 100 to 300 MHz. Such difference in frequencies is related to an amount of information to be transmitted. That is to say, a transmission rate of information is made preferably higher to efficiently transmit and receive a large amount of information. Consequently, a frequency should be preferably made higher to make a transmission rate higher.

A most simple tuning means for receiving radio waves is to make the length of an antenna equivalent to wave length. Since electromagnetic waves are transmitted in a space at a speed same as that of light (300,000 km per second), wave length can be obtained by dividing a light velocity by a frequency. For instance, the length of an antenna is set to 1 m in the case in which a frequency is 300 MHz. However, it is difficult to lengthen an antenna to be 1 m for a wristwatch-type radio receiver. Therefore, in many cases, many kinds of tuning means are utilized while an antenna is made shorter than wave length. As one of such many methods, it is known that an opening area of an antenna is enlarged.

However, in the case in which an antenna that includes a large opening area is enclosed in a main body case, a main body is enlarged, resulting in the deterioration of portability, an external appearance, and attractiveness as a product. Therefore, for many products with a high frequency of radio waves to be received, an antenna is enclosed in a wrist band to make an opening area as large as possible.

Many types of wristwatch-type radio receivers provided with an antenna in a wrist band have been proposed (see the Patent Document 1, namely, Japanese Patent Laid-Open Publication No. HEI 5 (1993)-183454, for instance). The wristwatch-type radio receiver described in the Patent Document 1 has a configuration as shown in FIG. 12.

A wristwatch-type radio receiver 100 is provided with a wristwatch-type radio receiver main body 104 including a liquid crystal panel 102 that displays received messages. The bands 106 and 108 made of a nonconductive member such as leather and vinyl leather to be worn on a wrist are attached to the wristwatch-type radio receiver main body 104.

The antenna members 110 and 112 made of a thin metal plate are installed in the bands 106 and 108, respectively. The antenna members 110 and 112 are connected to a circuit of a receiving apparatus (not shown) installed in the wristwatch-type radio receiver main body 104.

A hook metal fitting 116 is attached to the free edge of the band 106, and a link metal fitting 114 is attached to the band 108 in such a manner that the link metal fitting 114 can be slid and fixed to the desired position.

By the above configuration, the wristwatch-type radio receiver can be worn on a wrist by engaging the hook metal fitting 116 of the band 106 with the link metal fitting 114 of the band 108.

On the rear surface of the band 106, a conductive projection 118 is formed at the position to which the hook metal fitting 116 is attached.

By the above configuration, in the case in which the hook metal fitting 116 of the band 106 is engaged with the link metal fitting 114 of the band 108, the projection 118 touches the antenna member 112 exposed through a hole 120 of the band 108, thus electrically connecting antenna members 110 and 112 to each other. As a result, the antenna members 110 and 112 can form a loop.

Patent Document 1: Japanese Patent Laid-Open Publication No. HEI 5 (1993)-183454 (Pages 2 and 3, and FIG. 1)

In such a configuration in which the conductive projection 118 of the band 106 touches the antenna member 112 of the band 108, a structure for fixing the bands 106 and 108 to each other are different and separate from a structure for maintaining the electrical connection of antennas. Consequently, the bands 106 and 108 cannot rotate (swing) to each other in the width direction of the bands to each other around the contact section 122 between the conductive projection 118 and the antenna member 112 as shown by the arrows A in FIG. 13.

Accordingly, in the case in which the wristwatch-type radio receiver 100 is worn on a wrist, the movement in the width direction of the bands 106 and 108 (the direction of the arrow A) has no margin as described above. As a result, it is impossible that the band position is finely adjusted in such a manner that the wristwatch-type radio receiver is suitably worn according to the size and shape of wrists depending 6*n* persons, thus resulting in unpleasant wear and occasionally unfitness.

In consideration of the circumstances, it is an object of the present invention to provide a band coupling structure incorporating conductive wires to be used for receiving radio waves in portable compact information terminals that receive many kinds of information by utilizing radio waves. For such a band coupling structure, the bands can rotate (swing) to each other in the width direction of the bands at a band coupling section, the movement of the bands in the width direction of the band has a margin, the band position can be finely adjusted in such a manner that the wristwatch-type radio receiver is suitably worn according to the size and shape of a worn section of a human body such as a wrist, unpleasant wear and unfitness can be prevented, a satisfactory electrical connection of conductive wires can be maintained even in the case in which the bands rotate to each other, and the bands can be easily attached to or detached from a worn section of a human body such as a wrist.

SUMMARY OF THE INVENTION

The present invention has been made in order to solve the problems and to achieve the objects in the prior art described above, and provides a band coupling structure incorporating conductive wires comprising:

a band coupling projection pin section formed in one coupling part of a coupling section of the bands, said band coupling projection pin section comprising, a connection pin protruded upward from the band, which is electrically connected to the conductive wire, and a band coupling lock pin, which is located on the periphery of the connection pin and electrically insulated from the connection pin, and in another coupling part of the coupling section of the bands, a connection pin fitting section, which is abutted by an edge portion of the connection pin, and a lock pin locking section for locking the band coupling lock pin are provided, in the case in which the bands are coupled with each other, the edge portion of the connection pin is abutted to and electrically connected to the connection pin fitting section, and by locking the band coupling lock pin with the lock pin locking section, one coupling part and another coupling part of the band coupling section can rotate to each other on the axis of the coupling section in the width direction of the bands.

By the above configuration, the bands can be easily coupled with each other at the coupling section of the bands by locking the band coupling lock pin with the lock pin locking section.

In this state, the edge portion of the connection pin is abutted to the connection pin fitting section, thus ensuring an electrical connection. In addition, one coupling part and another coupling part of the band coupling section can rotate (swing) to each other on the axis of the band coupling section in the width direction of the bands.

Consequently, by applying this band coupling structure to a band coupling structure incorporating conductive wires used for receiving radio waves in portable compact information terminals that receive many kinds of information by utilizing radio waves, such as a radio controlled wristwatch and a wristwatch-type pager, the bands can rotate to each other in the width direction of the bands at the band coupling section, the movement of bands in the width direction of the bands has a margin. Therefore, the band position can be finely adjusted in such a manner that the wristwatch-type radio receiver is suitably worn according to the size and shape of a worn section of a human body such as a wrist, thus preventing unpleasant wear and unfitness.

Moreover, a satisfactory electrical connection of conductive wires can be maintained even in the case in which the bands rotate to each other, thus ensuring constant excellent receiving states. In addition, the bands can be easily attached to or detached from a worn section of a human body such as a wrist.

Moreover, the band coupling structure incorporating conductive wires of the present invention is characterized by comprising an abutment energizing means for energizing in the abutment direction in the case in which the edge portion of the connection pin is abutted to the connection pin fitting section.

By the above configuration, energizing is performed in the abutment direction by the abutment energizing means in the case in which the edge portion of the connection pin and the connection pin fitting section are abutted to each other. Therefore, the abutment state and the electrical connection between the edge portion of the connection pin and the connection pin fitting section is ensured.

Moreover, even in the case in which the vibration on a worn section of a human body such as a wrist and so on is applied to the band coupling structure, the abutment state can be maintained by the abutment energizing means, thus ensuring the constant electrical connection. Therefore, information sent by radio waves can be reliably received by the portable compact information terminals that receive many kinds of information by utilizing radio waves such as a radio controlled wristwatch and a wristwatch-type pager.

Furthermore, the band coupling structure incorporating conductive wires of the present invention is characterized in that the abutment energizing means is an energizing means for energizing the edge portion of the connection pin in the direction abutting to the connection pin fitting section.

By the above configuration, the edge portion of the connection pin is energized in the direction abutting to the connection pin fitting section by the abutment energizing means in the case in which the edge portion of the connection pin and the connection pin fitting section are abutted to each other. As a result, the abutment state and the electrical connection between the edge portion of the connection pin and the connection pin fitting section is ensured.

Still further, the band coupling structure incorporating conductive wires of the present invention is characterized in that the abutment energizing means is an energizing means for energizing the connection pin fitting section in the direction abutting to the edge portion of the connection pin.

By the above configuration, the connection pin fitting section is energized in the direction abutting to the edge portion of the connection pin by the abutment energizing means in the case in which the edge portion of the connection pin and the connection pin fitting section are abutted to each other. Therefore, the abutment state and the electrical connection between the edge portion of the connection pin and the connection pin fitting section is ensured.

Still further, the band coupling structure incorporating conductive wires of the present invention is characterized in that the connection pin and the band coupling lock pin are located coaxially with.

As described above, since the connection pin and the band coupling lock pin are located coaxially, while an edge portion of the connection pin is abutted to and electrically connected to the connection pin fitting section in the state in which the band coupling lock pin is locked with the lock pin locking section, one coupling part and another coupling part of the band coupling section can rotate (swing) to each other in the width direction of the bands on the axis of the connection pin and the band coupling lock pin that are located coaxially with each other.

Still further, the band coupling structure incorporating conductive wires of the present invention is characterized in that an insulating member is located between the connection pin and the band coupling lock pin for electrically insulating the connection pin and the band coupling lock pin.

By the above configuration, an insulating member for electrically insulating the connection pin and the band coupling lock pin is provided so that an external electrical leak through the band coupling lock pin and the conductive wires incorporated in the bands can be prevented.

In addition, the band coupling lock pin can be made of metal material with satisfactory mechanical strength as a coupling structure, thus achieving the satisfactory mechanical strength of a band coupling structure.

Still further, the band coupling structure incorporating conductive wires of the present invention is characterized in that:

an engaging groove is formed on the side of the band coupling lock pin; and a locking projection is formed in the lock pin locking section; and the band coupling lock pin can be detachably locked with the lock pin locking section by fitting the locking projection into the engaging groove.

By the above configuration, in the case in which the bands are coupled with each other, the bands can be detachably coupled with each other at the band coupling section by fitting the locking projection formed in the lock pin locking section into the engaging groove formed on the side of the band coupling lock pin.

Moreover, in the case in which the bands are coupled with each other at the coupling section, since the locking projection is fitted into the engaging groove, the band coupling state is not released due to vibration and so on. In addition, as the locking projection slides in the engaging groove, the bands can smoothly rotate to each other in the width direction of the bands at the coupling section.

Still further, the band coupling structure incorporating conductive wires of the present invention is characterized in that the band coupling projection pin section formed in one coupling part of the coupling section of the bands is movable in a longitudinal direction of the band.

By the above configuration, since the band coupling projection pin section formed in one coupling part of the coupling section of the bands can be moved in a longitudinal direction of the band, the band coupling position can be finely adjusted in a longitudinal direction of the band in such a manner that the wristwatch-type radio receiver is suitably worn according to the size and shape of a worn section of a human body such as a wrist, thus preventing unpleasant wear and unfitness.

Still further, the band coupling structure incorporating conductive wires of the present invention is characterized in that the band coupling structure is a band link structure for coupling the edges of the bands with each other.

By the above configuration, the band coupling structure of the present invention can be applied to the band link structure of portable compact information terminals that receive many kinds of information by utilizing radio waves such as a radio controlled wristwatch and a wristwatch-type pager.

Consequently, the bands can rotate to each other in the width direction of the bands at the link section, that is a coupling section of the bands, the movement of the bands in the width direction of the bands has a margin, and the band position can be finely adjusted in such a manner that the wristwatch-type radio receiver is suitably worn according to the size and shape of a worn section of a human body such as a wrist, thus preventing unpleasant wear and unfitness.

Moreover, a satisfactory electrical connection of conductive wires can be maintained even in the case in which the bands rotate to each other. In addition, the bands can be easily attached to or detached from a worn section of a human body such as a wrist.

Still further, the band coupling structure incorporating conductive wires of the present invention is characterized in that the band coupling structure is a band coupling structure for coupling the edge of the band and an apparatus that uses a conductive wire being coupled with the band.

By the above configuration, the band coupling structure of the present invention can be applied to a band coupling structure for coupling the edge of the band and an apparatus that uses a conductive wire being coupled with the band, for instance, a portable compact information terminal that receives many kinds of information by utilizing radio waves such as a radio controlled wristwatch and a wristwatch-type pager.

Consequently, the bands can rotate to each other at the coupling section between the edge of the band and an apparatus that uses a conductive wire being coupled with the band, the movement of the band in the width direction of the band has a margin, and the band position can be finely adjusted in such a manner that the wristwatch-type radio receiver is suitably worn according to the size and shape of a worn section of a human body such as a wrist, thus preventing unpleasant wear and unfitness.

Moreover, a satisfactory electrical connection of conductive wires can be maintained even in the case in which the band and the apparatus rotate to each other. In addition, the band and the apparatus can be easily attached to or detached from a worn section of a human body such as a wrist.

According to the present invention, the bands can be easily coupled with each other at the coupling section of the bands by locking a band coupling lock pin with a lock pin locking section.

In this state, an edge portion of a connection pin is abutted to a connection pin fitting section, thus ensuring an electrical connection. In addition, one coupling part and another coupling part of the band coupling section can rotate (swing) to each other in the width direction of the bands on the axis of the band coupling section.

Consequently, by applying this band coupling structure to a band coupling structure incorporating conductive wires that are used for receiving radio waves in portable compact information terminals that receive many kinds of information by utilizing radio waves, such as a radio controlled wristwatch and a wristwatch-type pager, the bands can rotate to each other in the width direction of the bands at the band coupling section, the movement of bands in the width direction of the bands has a margin, and the band position can be finely adjusted in such a manner that the wristwatch-type radio receiver is suitably worn according to the size and shape of a worn section of a human body such as a wrist, thus preventing unpleasant wear and unfitness.

In the present invention, moreover, a satisfactory electrical connection of conductive wires can be maintained even in the case in which the bands rotate to each other. In addition, bands can be easily attached to or detached from a worn section of a human body such as a wrist.

DETAILED DESCRIPTION OF THE INVENTION

A presently preferred embodiment (example) of the present invention will be described below with reference to the drawings.

Figure 1:
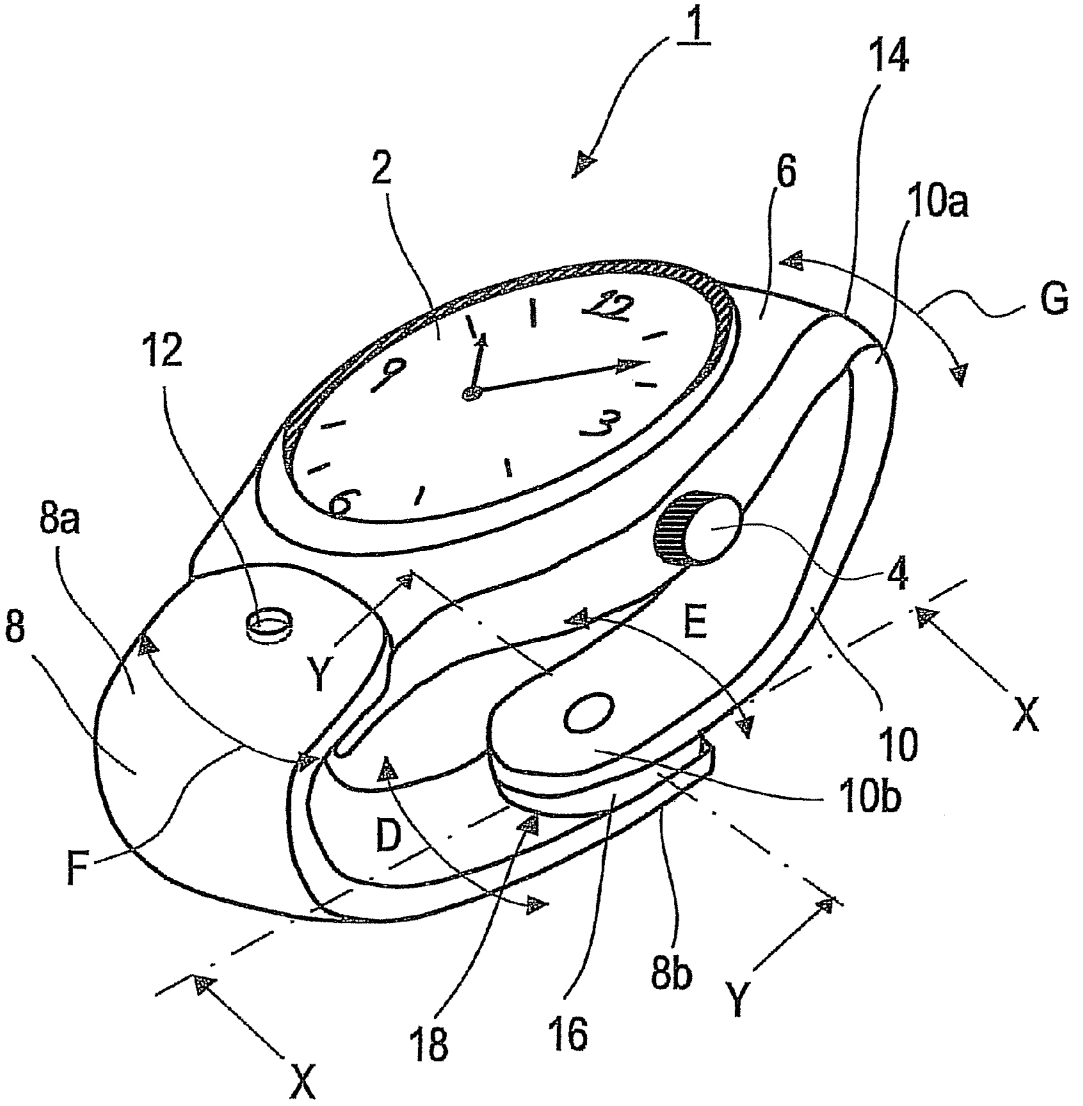
FIG. 1 is a perspective view showing an embodiment in which a band coupling structure incorporating conductive wires of the present invention is applied to a radio controlled wristwatch, in which the bands are coupled with each other.
Figure 2:
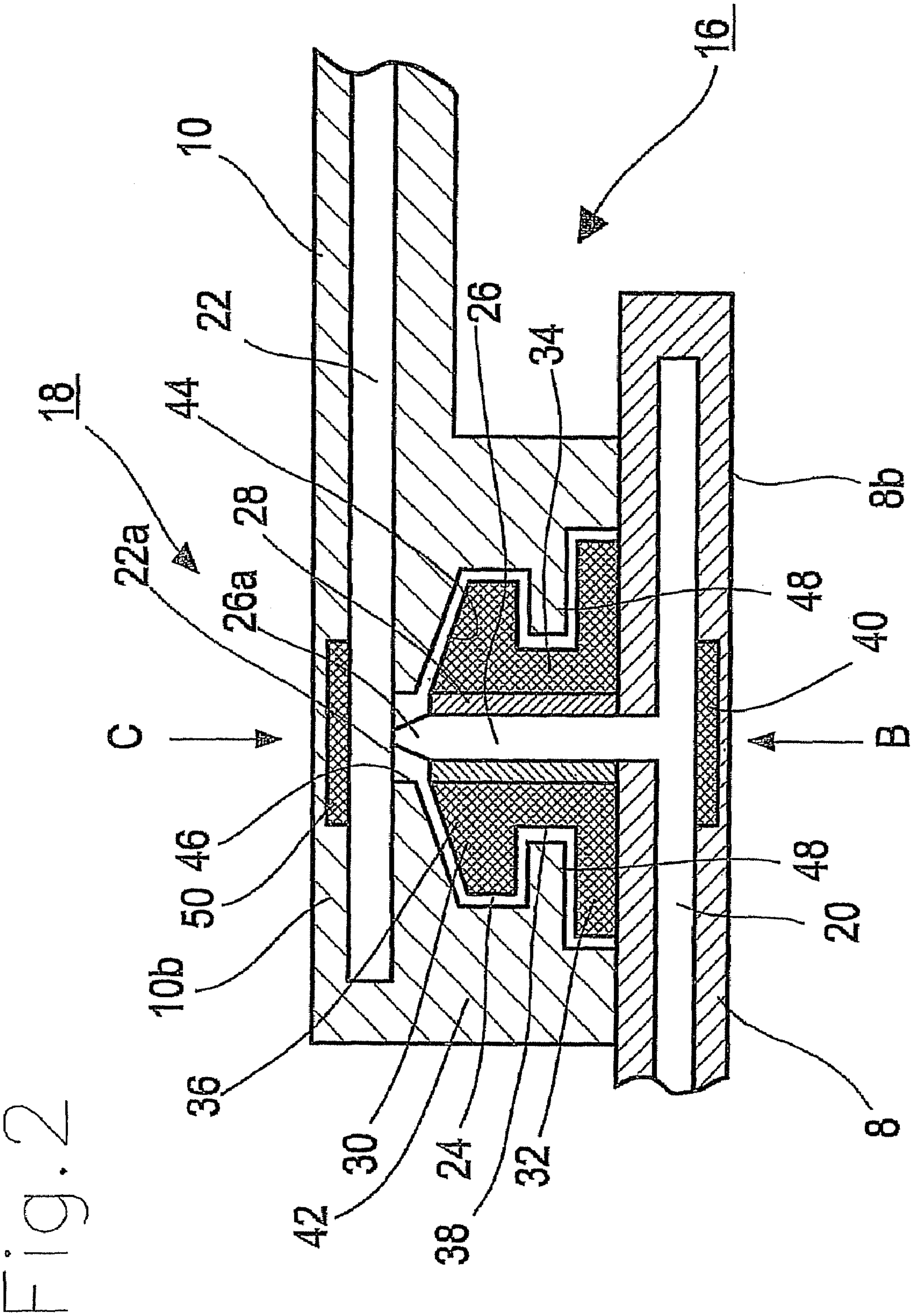
FIG. 2 is a cross-sectional view along the line X-X shown in FIG. 1.
Figure 3:
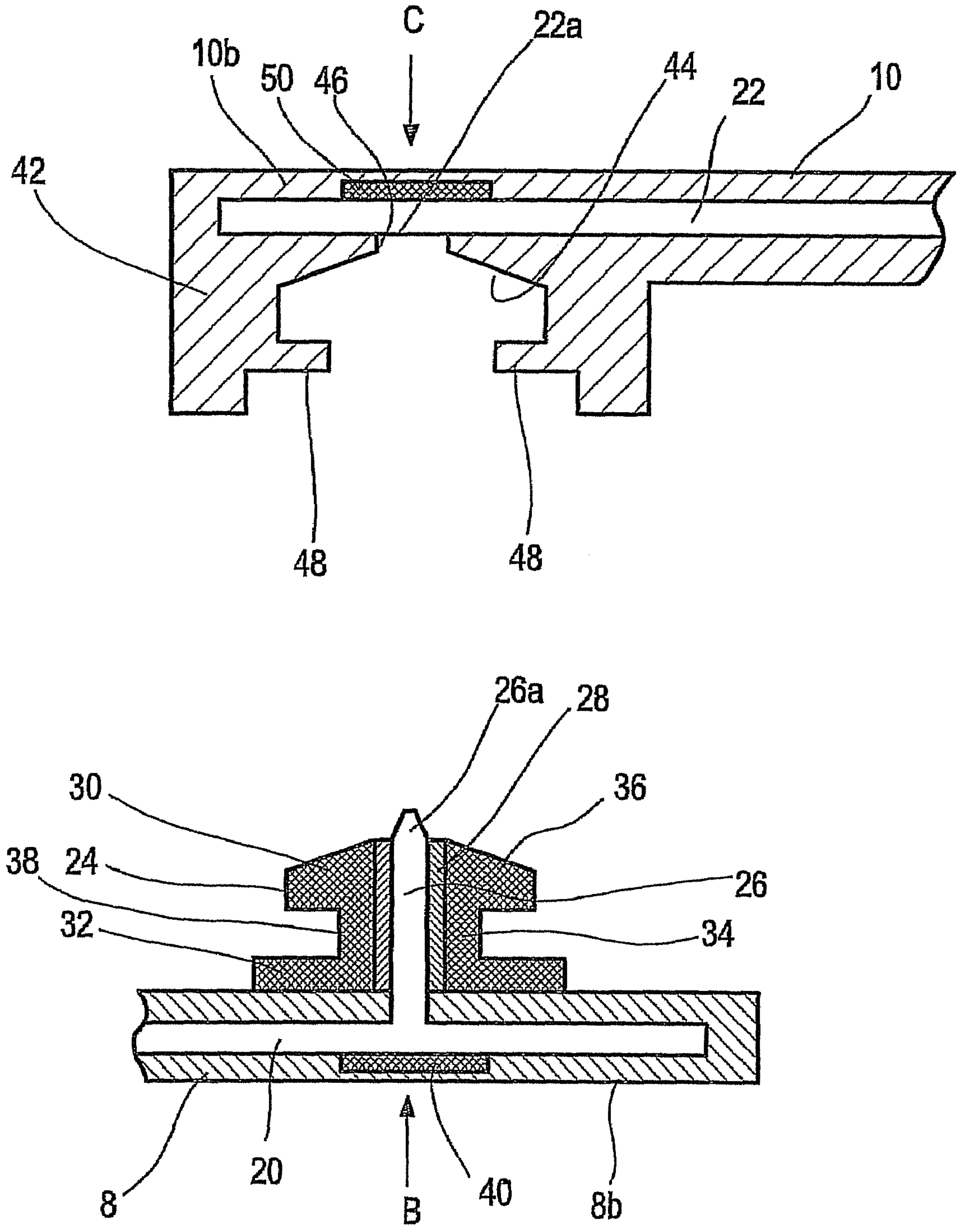
FIG. 3 is a cross-sectional view showing an embodiment in which one coupling part is detached from another coupling part of the band coupling section shown in FIG. 2.

FIG. 1 is a perspective view showing an embodiment in which a band coupling structure incorporating conductive wires of the present invention is applied to a radio controlled wristwatch, in which bands are coupled with each other. FIG. 2 is a cross-sectional view along the line X-X shown in FIG. 1. FIG. 3 is a cross-sectional view showing an embodiment in which one coupling part is detached from another coupling part of the band coupling section shown in FIG. 2.

The reference numeral 1 shows a radio controlled wristwatch to which a band coupling structure incorporating conductive wires of the present invention (hereafter simply referred to as band coupling structure) is applied in FIG. 1.

The radio controlled wristwatch 1 is provided with a watch main body 6 including a display window 2 for indicating time and an adjusting button 4 for adjusting time (the stem). Although analog display is adopted for the display window 2 in the embodiment shown in FIG. 1, other display methods such as liquid crystal display can also be adopted.

The bands 8 and 10 that are a nonconductive member made of rubber, leather, vinyl leather, and synthetic resin such as urethane are attached to the watch main body 6 in such a manner that the radio controlled wristwatch can be worn on a wrist.

The edges 8*a* and 10*a* of the bands 8 and 10 are attached to the watch main body 6 via band coupling sections 12 and 14, respectively, at the positions in the six and twelve o'clock directions.

The bands 8 and 10 are coupled detachably with each other at other edges 8*b* and 10*b* of the bands 8 and 10 at the band coupling section 16.

The band coupling structure of the present invention is applied to the band coupling sections 12, 14, and 16.

The band coupling structure of the present invention is described in the following utilizing the coupling section 16 that is a band link structure as an example.

As shown in FIGS. 1 to 3, the band coupling structure of the present invention is applied to the band coupling structure 18 for coupling the edge 8*b* of the band 8 that is one coupling part of the band coupling section 16 with the edge 10*b* of the band 10 that is another coupling part of the band coupling section 16.

As shown in FIGS. 2 and 3, the antenna members 20 and 22 that configure conductive wires are provided in the bands 8 and 10, respectively, and are connected to a circuit of a receiving apparatus (not shown) installed in the watch main body 6.

A band coupling projection pin section 24 is provided on the edge 8*b* of the band 8 that is one coupling part of the band coupling section 16. The band coupling projection pin section 24 is formed upward from the upper surface of the band 8 (the wrist side of the band 8 in this embodiment). A connection pin 26 protruded upward from the band 8 is incorporated in the center of the band coupling projection pin section 24 in such a manner that the connection pin 26 can be electrically connected to the antenna member 20 provided in the band 8.

An insulating sleeve member 28 is located on the periphery of the connection pin 26 coaxially with the connection pin 26. In addition, a band coupling lock pin 30 is located on the periphery of the insulating sleeve member 28 coaxially with the connection pin 26.

The insulating sleeve member 28 electrically insulates the connection pin 26 and the band coupling lock pin 30. Although rubber, synthetic resin such as urethane, and lubricating oil with viscosity can be adopted for the insulating sleeve member, the material is not restricted to them.

As shown in FIG. 2, the band coupling lock pin 30 is provided with a lock pin base section 32 with a diameter increased in the disc shape along the upper surface of the band 8. The band coupling lock pin 30 is also provided with a lock pin main body 34 that is thinner than the lock pin base section 32 and a lock pin blade section 36 that was formed with a diameter increased in the peripheral direction. By the above configuration, an engaging groove 38 is formed on the side wall of the band coupling lock pin 30.

As shown in FIG. 2, an energizing member 40, which energizes the connection pin 26 in the abutment direction B (upward), is formed on the lower surface of the antenna member 20 (on the opposite side of the position of the connection pin 26, that is opposite the wrist side in this embodiment) in the band 8.

Figure 10:
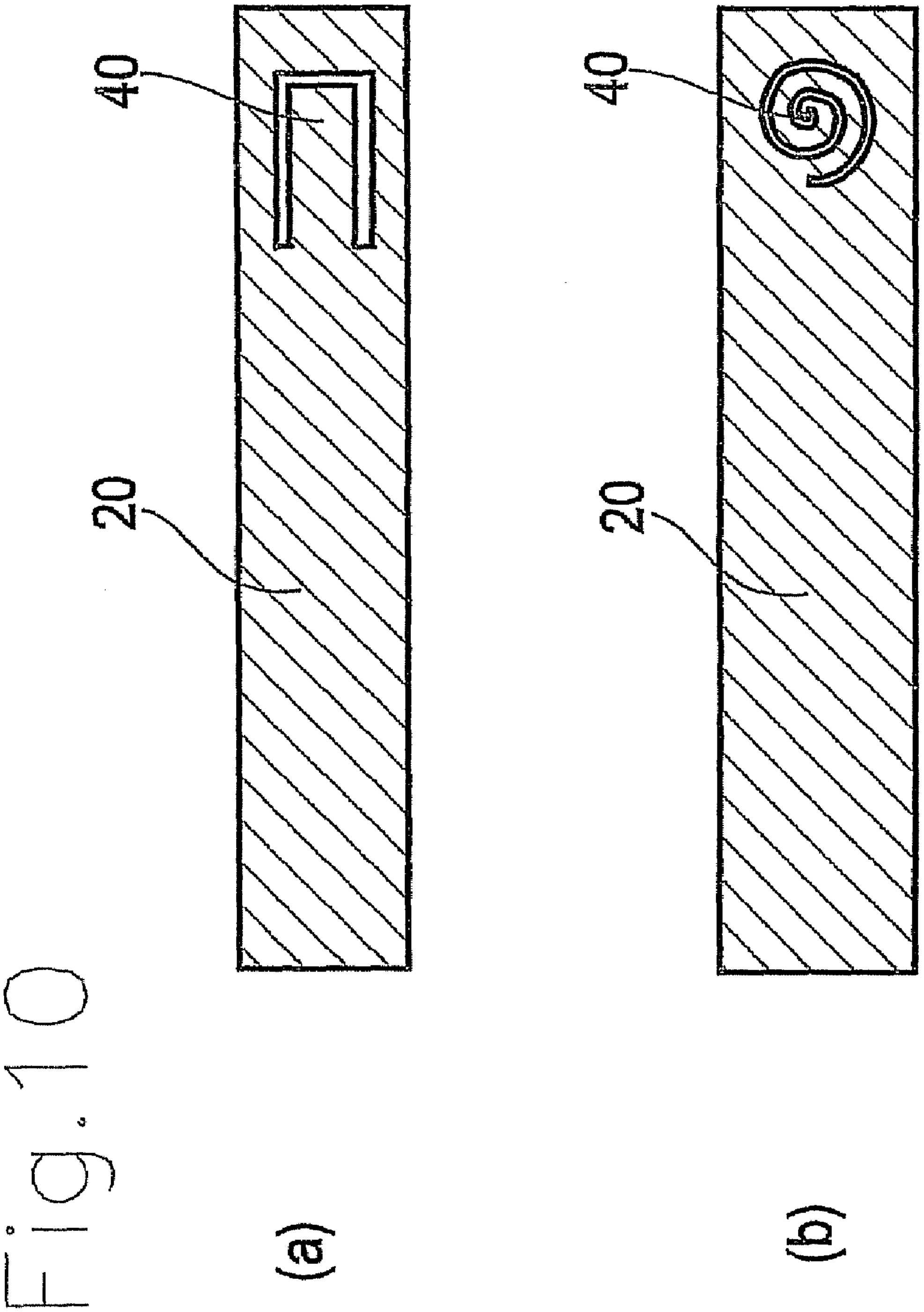
FIG. 10 is a schematic view showing another embodiment of an energizing member 40.

An elastic member such as elastomer material is used as the energizing member 40 in this embodiment, however, it is not restricted to the material, and a spring member (not shown) can also be adopted. In addition, for the energizing member 40, the antenna member 20 can be punched to be the U-shaped spring as shown in FIG. 10(*a*), or to be the spiral spring as shown in FIG. 10(*b*). Any member with an energizing force can also be adopted.

As shown in FIGS. 2 and 3, a locking section 42 for locking the band coupling projection pin section 24 is formed on the lower surface of the edge 10*b* of the band 10 that is another coupling part of the band coupling section 16 (opposite the wrist side of band 10 in this embodiment).

A lock pin locking section 44, which is provided with a depression with an outline shape complementary to that of the lock pin main body 34 and the lock pin blade section 36 of the band coupling lock pin 30, is formed in the locking section 42. In the bottom of the lock pin locking section 44, a connection pin fitting section 46 composed of a depression, which is fitted by an edge portion 26*a* of the connection pin 26 in the case in which the bands are coupled with each other, is formed as shown in FIG. 3.

An exposed section 22*a*, in which the antenna member 22 of the band 10 is exposed, is formed in the bottom of the connection pin fitting section 46. The edge portion 26*a* of the connection pin 26 is abutted to the antenna member 22 in the case in which the bands are coupled with each other as shown in FIG. 2.

An engaging projection 48 is formed in the lock pin locking section 44 in such a manner that the engaging projection 48 is engaged with the engaging groove 38 formed on the side wall of the band coupling lock pin 30. As shown in FIG. 2, an energizing member 50, which energizes the connection pin fitting section 46 in the direction C abutting to the edge portion 26*a* of the connection pin 26 (downward), is formed on the upper surface of the antenna member 22 to which the edge portion 26*a* of the connection pin 26 is abutted (on the side of the position of a wrist in this embodiment) in the band 10. The energizing member 50 can be made of the material and have a configuration both which are equivalent to those of the energizing member 40.

The locking section 42 is made of insulating and flexible material such as synthetic resin or rubber. Consequently, in the case in which the band coupling projection pin section 24 on the edge 8*b* of the band 8 is engaged with the locking section 42 of the band 10, the band coupling lock pin 30 can be detachably coupled with the locking section 42 by engaging the engaging projection 48 of the locking section 42 with the engaging groove 38 of the band coupling lock pin 30 (that is a snap fit method), as shown in FIGS. 2 and 3.

In the coupling state as shown in FIG. 2, the engaging projection 48 of the locking section 42 can slide and rotate in the engaging groove 38 of the band coupling lock pin 30 under the condition in which the engaging projection 48 of the locking section 42 is engaged with the engaging groove 38 of the band coupling lock pin 30. Therefore, the edge 8*b* of the band 8 that is one coupling part of the band coupling section 16 and the edge 10*b* of the band 10 that is another coupling part can rotate (swing) to each other on the axis of the coupling section 16 in the width direction of the bands 8 and 10 as shown by arrows D and E in FIG. 1.

By the above configuration, the movement of bands in the width direction of the band has a margin, the band position can be finely adjusted in such a manner that the wristwatch-type radio receiver is suitably worn according to the size and shape of a worn section of a human body such as a wrist, and unpleasant wear and unfitness can be prevented.

Even in such a rotation state, since the edge portion 26*a* of the connection pin 26 is kept to be abutted to the antenna member 22, satisfactory electrical connection can be maintained between the antenna members 20 and 22 that are conductive wires incorporated in the bands 8 and 10, respectively. As a result, satisfactory receiving states can be maintained, and the bands can be easily attached to or detached from a worn section of a human body such as a wrist.

In the coupling state, since the energizing member 40 for energizing the connection pin 26 in the abutment direction B and the energizing member 50 for energizing the connection pin fitting section 46 in the abutment direction C to the edge portion 26*a* of the connection pin 26 are formed, the abutment state of the edge portion 26*a* of the connection pin 26 to the antenna member 22 is maintained. Consequently, satisfactory electrical connection can be further maintained between the antenna members 20 and 22 incorporated in the bands 8 and 10, respectively.

Although both the energizing member 40 and the energizing member 50 are formed in this embodiment, it is also possible that only any one of the energizing members 40 and 50 is formed.

The above embodiment has described the band coupling structure of the present invention referring to the coupling section 16 as an example. As shown in FIG. 1, however, the band coupling structure of the present invention can also applied to all the band coupling sections 12, 14, and 16, or to only a suitable band coupling section selected from them.

Figure 4:
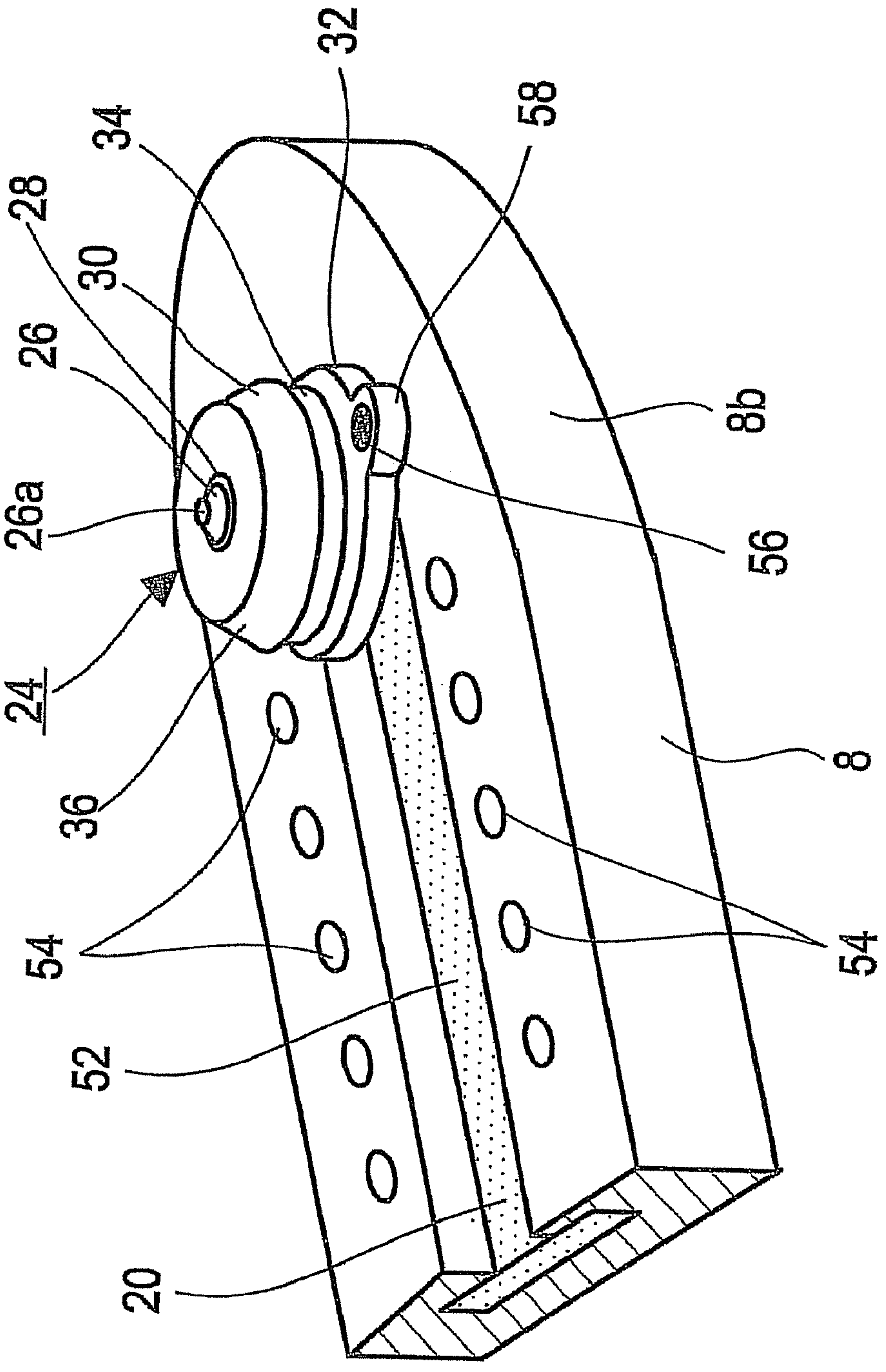
FIG. 4 is a partially expanded perspective view of the edge 8*b* of the band 8, showing another embodiment of a band coupling structure of the present invention.

FIG. 4 is a partially expanded perspective view of the edge 8*b* of the band 8 showing another embodiment of a band coupling structure of the present invention.

The band coupling structure 18 related to the present embodiment has the structure basically similar to the band coupling structure shown in FIGS. 2 and 3, and its elements equivalent to those shown in FIGS. 2 and 3 are numerically numbered similarly.

In the band coupling structure 18 related to the present embodiment, an antenna contact groove 52 is formed on the edge 8*b* of the band 8 in a longitudinal direction of the band 8 for exposing the antenna member 20.

On the both side edges on the upper surface of the band 8, the adjustment screw holes 54 are formed separately from each other at a constant pitch in a longitudinal direction of the band 8 in such a manner that a length of the band 8 can be adjusted.

The band length adjusting screw fixing sections 58 for screwing and fixing the band length adjusting screws 56 are formed in the both edges in the band transverse direction of the lock pin base section 32 of the band coupling lock pin 30.

A length of the band 8 can be adjusted by the above configuration.

That is to say, the band length adjusting screws 56 are loosened on the rear surface of the band 8 (the wrist side, the upper side in FIG. 4) or detached from the band length adjusting screw fixing sections 58 in the lock pin base section 32 of the band coupling lock pin 30.

Next, the whole of the band coupling projection pin section 24 is moved to the desired position in a longitudinal direction of the band 8. The band length adjusting screws 56 are then screwed and fixed into the band length adjusting screw fixing sections 58 of the lock pin base section 32 through the adjustment screw holes 54 of the band 8 from the rear surface of the band 8.

By the above configuration, the band coupling projection pin section 24 can be fixed to the desired position in a longitudinal direction of the band 8, thus adjusting a length of the band 8 to be the desired length.

In this embodiment, the adjustment screw holes 54 are formed separately from each other at a constant pitch in a longitudinal direction of the band 8 in such a manner that a length of the band 8 can be adjusted. However, the adjustment screw holes 54 can also be elliptic holes extending in a longitudinal direction of the band 8 (not shown) in such a manner that a length of the band 8 can be adjusted to be any length.

Figure 5:
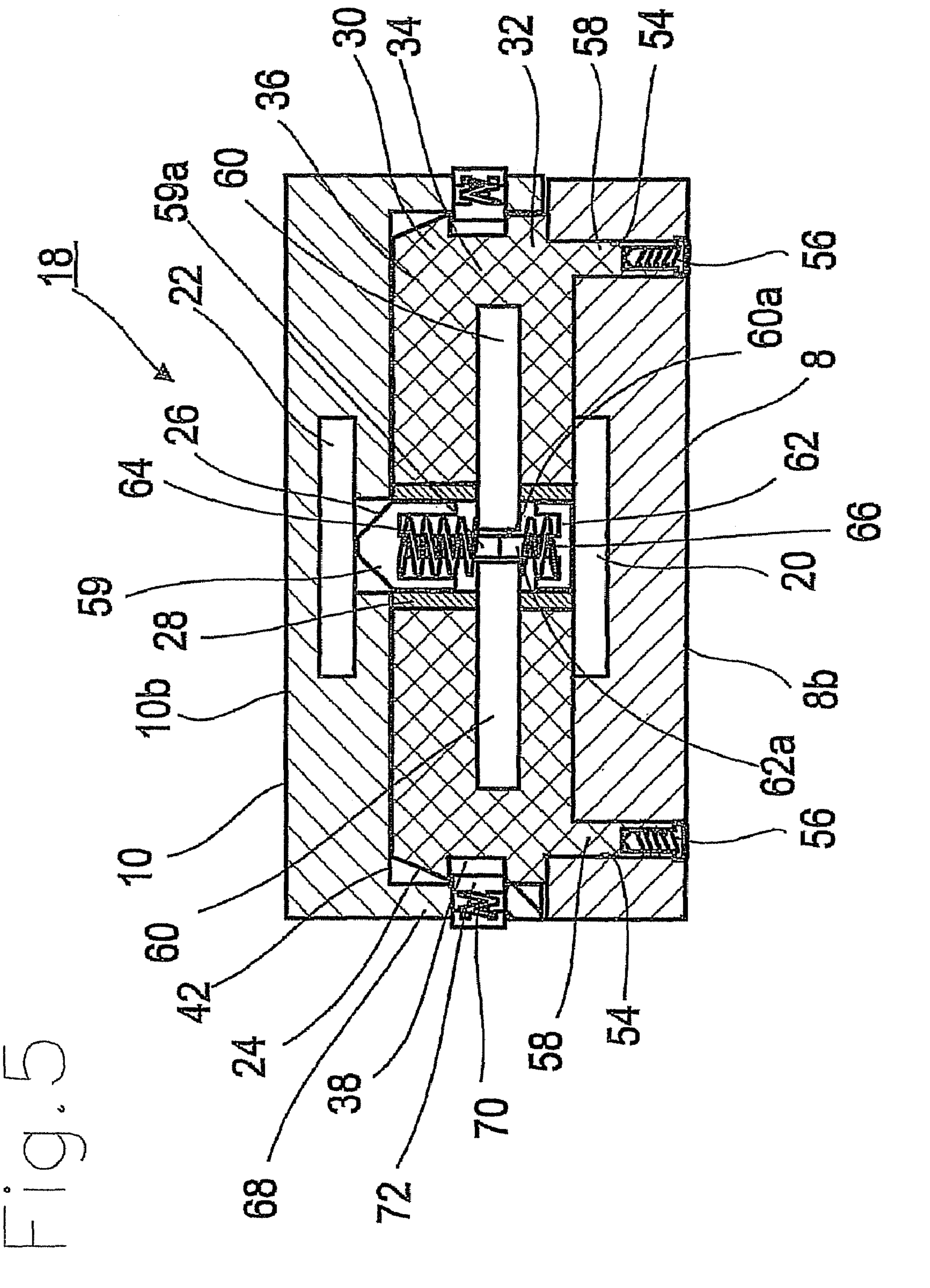
FIG. 5 is a schematic cross-sectional view along the line Y-Y shown in FIG. 1, showing another embodiment of a band coupling structure of the present invention.
Figure 6:
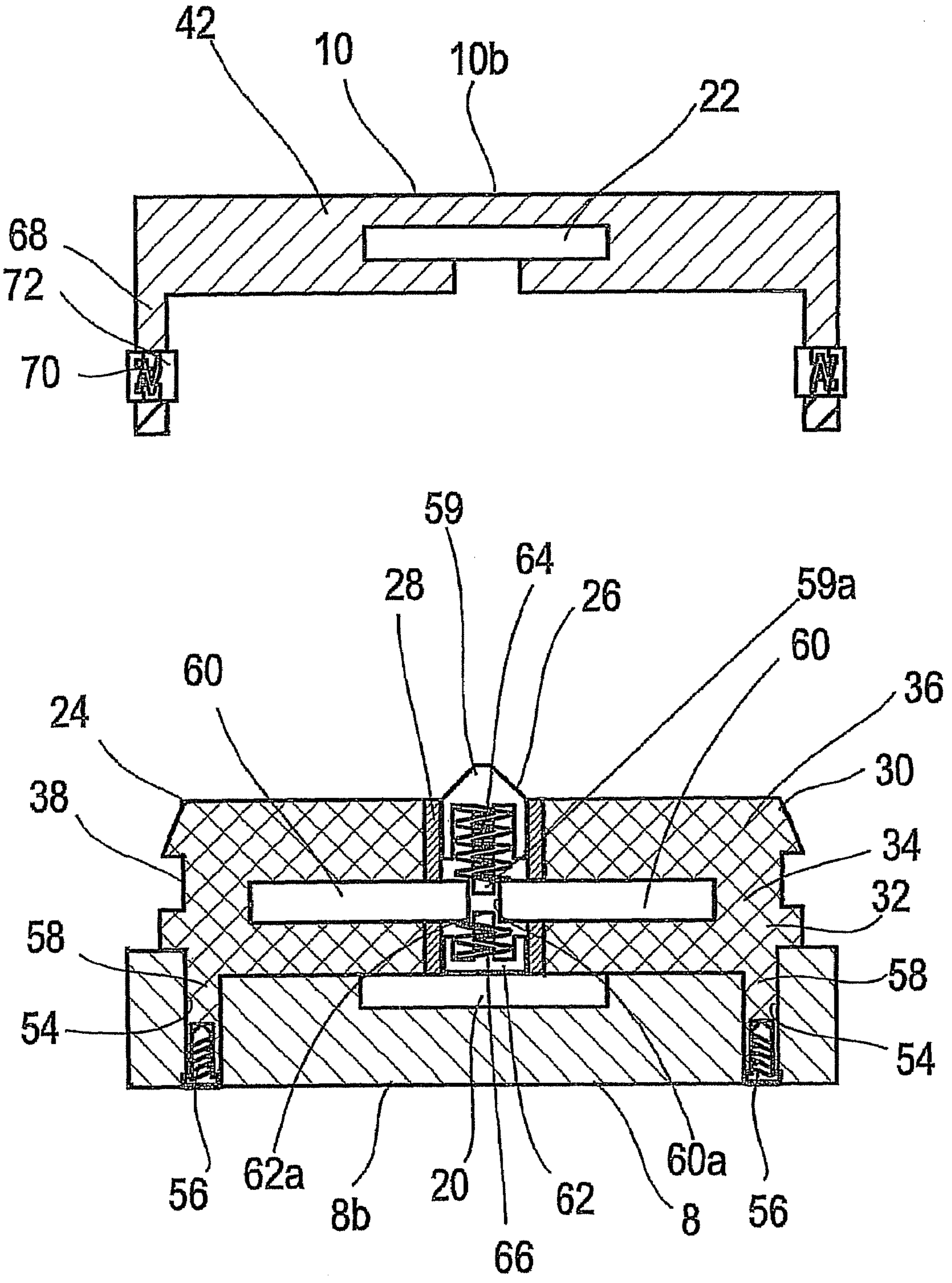
FIG. 6 is a schematic cross-sectional view showing an embodiment in which one coupling part is detached from another coupling part of the band coupling section shown in FIG. 5.
Figure 7:
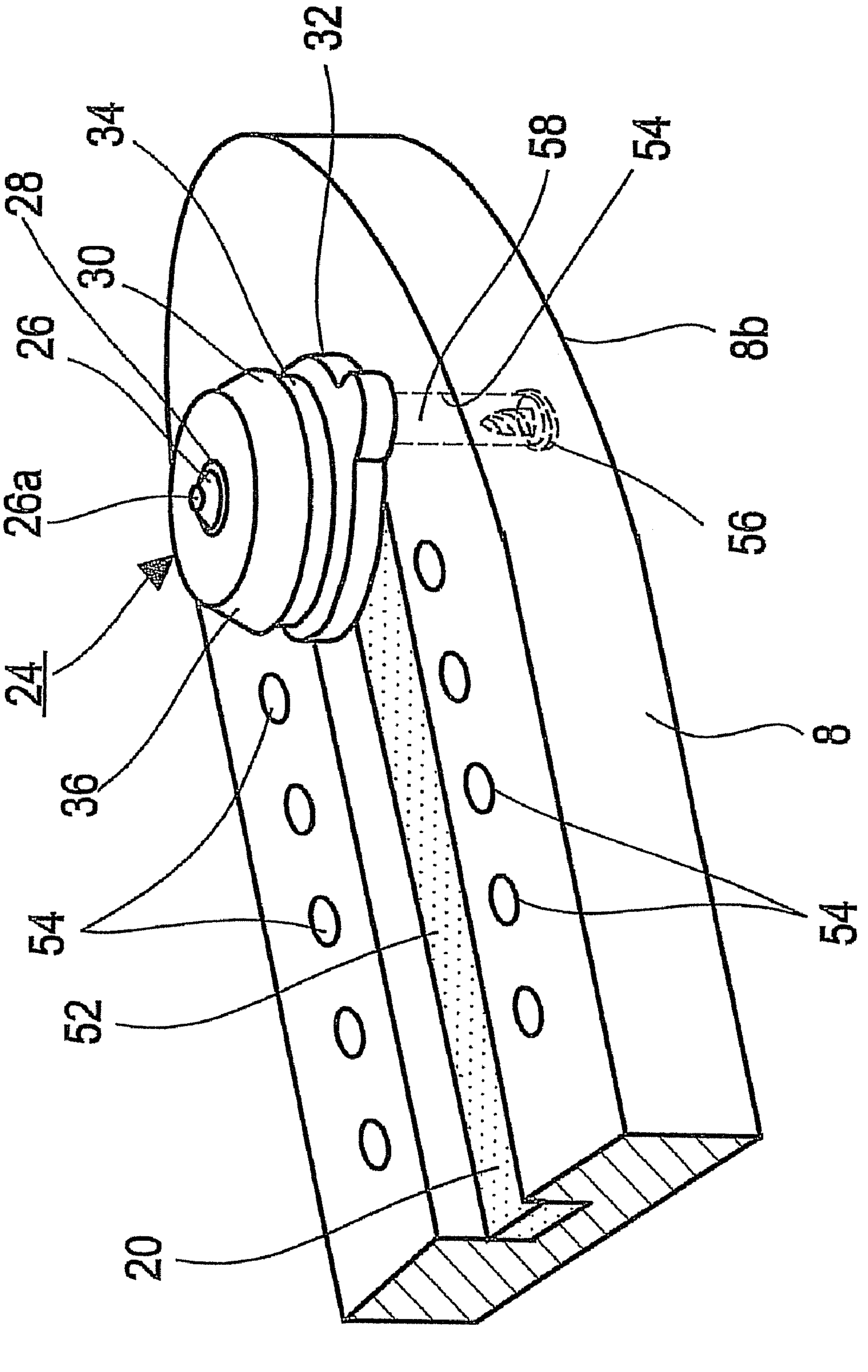
FIG. 7 is a partially expanded perspective view of the edge 8*b* of the band 8 in the band coupling structure shown in FIG. 5.

FIG. 5 is a schematic cross-sectional view along the line Y-Y shown in FIG. 1, showing another embodiment of a band coupling structure of the present invention. FIG. 6 is a schematic cross-sectional view showing an embodiment in which one coupling part is detached from another coupling part of the band coupling section shown in FIG. 5. FIG. 7 is a partially expanded perspective view of the edge 8*b* of the band 8 in the band coupling structure shown in FIG. 5.

The band coupling structure 18 related to the present embodiment has a structure basically similar to the band coupling structure shown in FIGS. 1 to 4, and its elements equivalent to those shown in FIGS. 1 to 4 are numerically numbered similarly.

In the band coupling structure 18 related to the present embodiment as shown in FIGS. 5 to 7, the band length adjusting screw fixing sections 58 in the lock pin base section 32 of the band coupling lock pin 30 are formed extending in a thickness direction of the band 8.

The band length adjusting screw fixing sections 58 are formed in such a manner that they can be inserted into the adjustment screw holes 54 of the band 8. In addition, a ring-shaped connection pin fixing member 60 made of insulating material is formed in the band coupling lock pin 30.

A length of the band 8 can be adjusted by the above configuration.

That is to say, the band length adjusting screws 56 are loosened on the surface of the band 8 and detached from the band length adjusting screw fixing sections 58 in the lock pin base section 32 of the band coupling lock pin 30.

Next, the whole of the band coupling projection pin section 24 is moved to the desired position in a longitudinal direction of the band 8. The band length adjusting screw fixing sections 58 are then inserted into the adjustment screw holes 54 of the band 8, and the band length adjusting screws 56 are screwed and fixed into the band length adjusting screw fixing sections 58 of the lock pin base section 32 from the surface of the band 8.

By the above configuration, the band coupling projection pin section 24 can be fixed to the desired position in a longitudinal direction of the band 8, thus adjusting a length of the band 8 to be the desired length.

The connection pin 26 is divided into an upper connection pin 59 and a lower connection pin 62, which are installed upward and downward from the connection pin fixing member 60, respectively.

An energizing member 64 such as a coil spring is located around a shaft center section 59*a* of the upper connection pin 59 in such a manner that the energizing member 64 energizes the upper connection pin 59 upward. In addition, an energizing member 66 such as a coil spring is located around a shaft center section 62*a* of the lower connection pin 62 in such a manner that the energizing member 66 energizes the lower connection pin 62 downward (in a direction of the antenna member 20).

The lower connection pin 62 is abutted to the antenna member 20 incorporated in the band 8 by the energizing force of the energizing member 66, thus maintaining a constant electrical contact. In the coupling state as shown in FIG. 5, the upper connection pin 59 is pressed and moved downward by the antenna member 22 of the band 10 against the energizing force of the energizing member 64. The shaft center section 59*a* of the upper connection pin 59 is then abutted to the shaft center section 62*a* of the lower connection pin 62 through a central hole 60*a* of the connection pin fixing member 60, thus implementing an electrical connection.

In the band coupling structure 18 related to the present embodiment as shown in FIGS. 5 and 6, the engaging projection 48 is not formed in the locking section 42 of the band 10, but the projections 68 are protruded downward from the both edges formed in the band transverse direction of the locking section 42.

The protruding locking members 72 are formed in the projections 68 in such a manner that the protruding locking members 72 are energized and protruded in the locking section 42 by the energizing members 70 such as coil springs. The band coupling lock pin 30 can be detachably coupled with the locking section 42 by engaging the protruding locking members 72 with the engaging groove 38 of the band coupling lock pin 30.

In this coupling state, the edge 8*b* of the band 8 that is one coupling part of the band coupling section 16 and the edge 10*b* of the band 10 that is another coupling part can rotate (swing) to each other on the axis of the coupling section 16 in the width direction of the bands 8 and 10 as shown by arrows D and E in FIG. 1.

Figure 11:
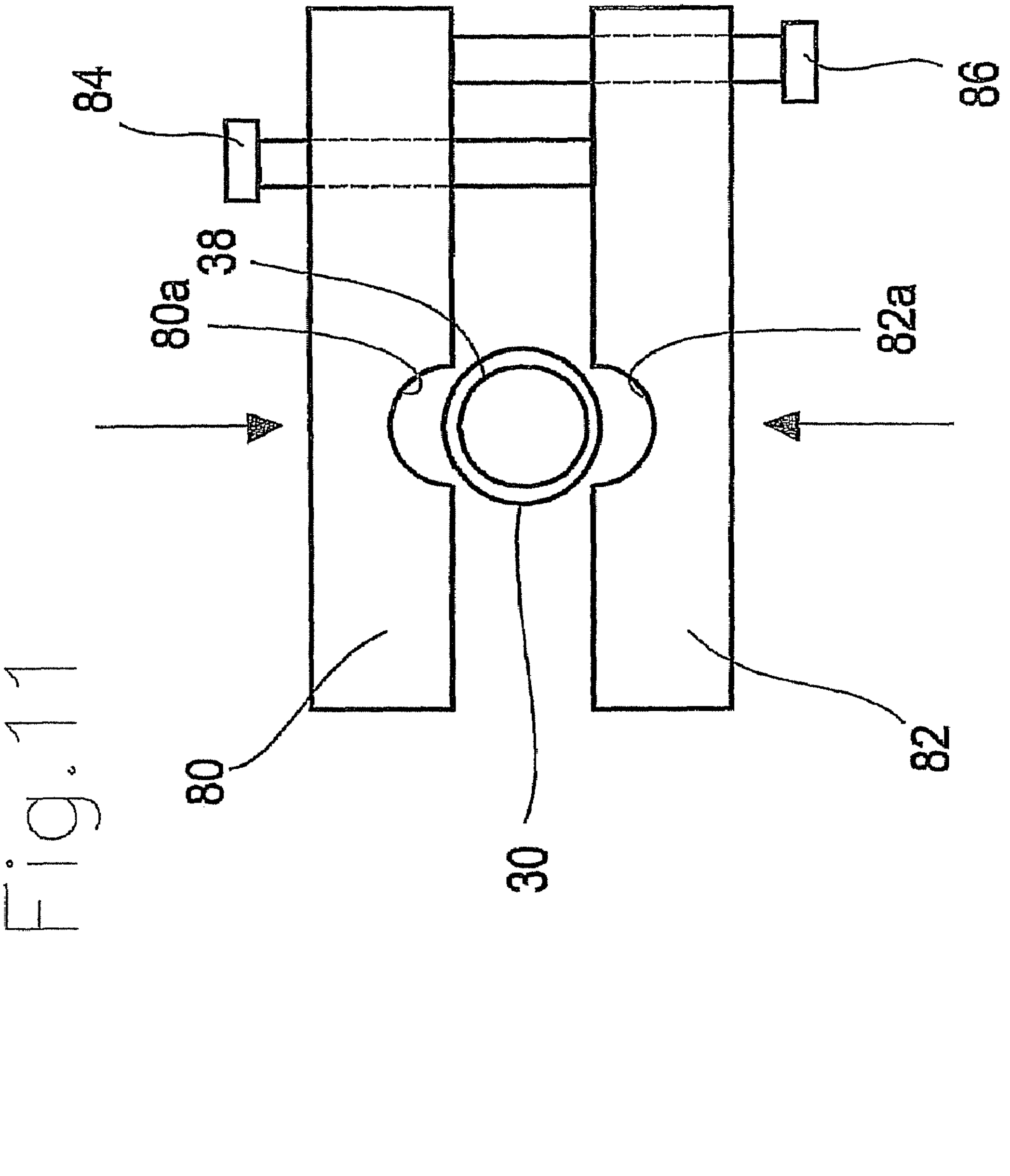
FIG. 11 is a schematic top view showing another embodiment of a band coupling structure of the present invention.
Figure 12:
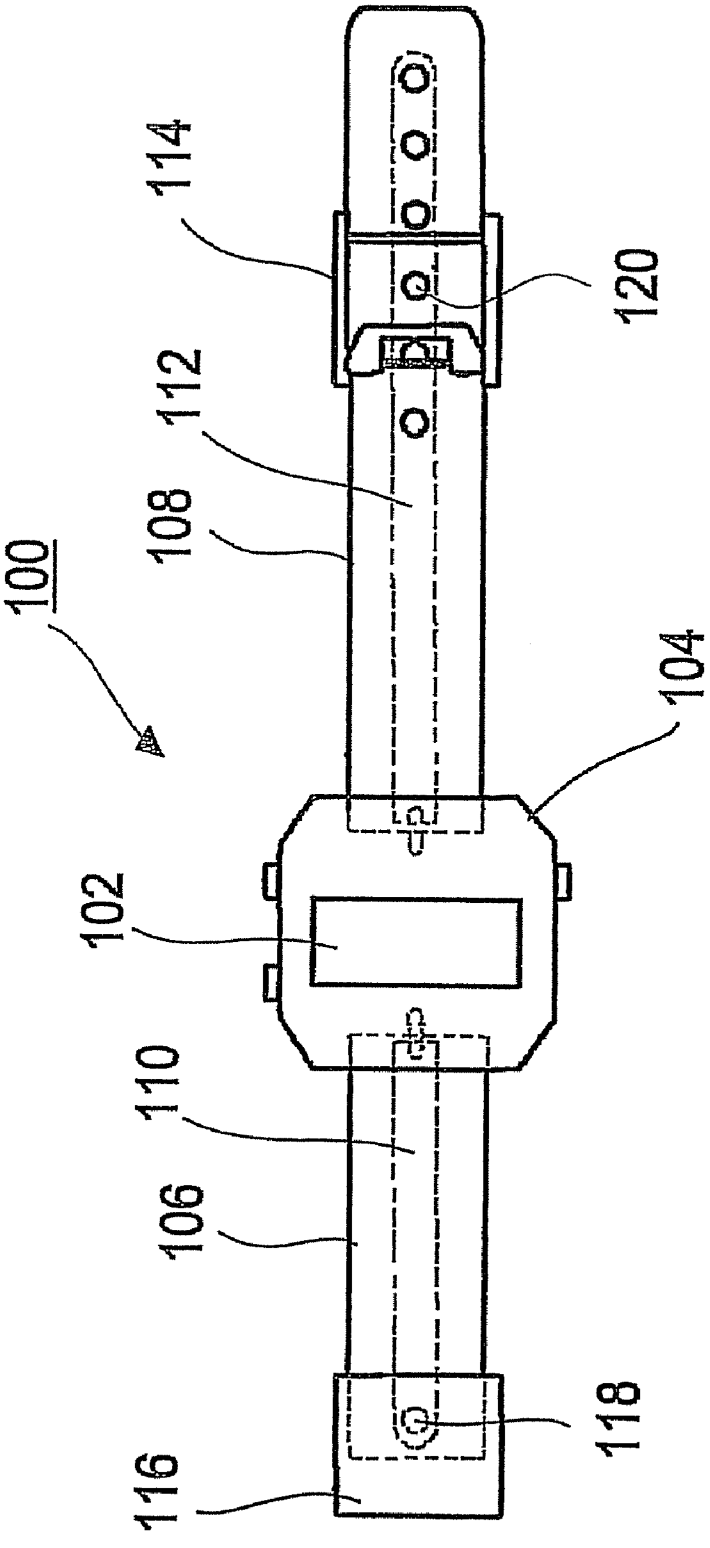
FIG. 12 is a schematic top view showing a conventional band coupling structure.
Figure 13:
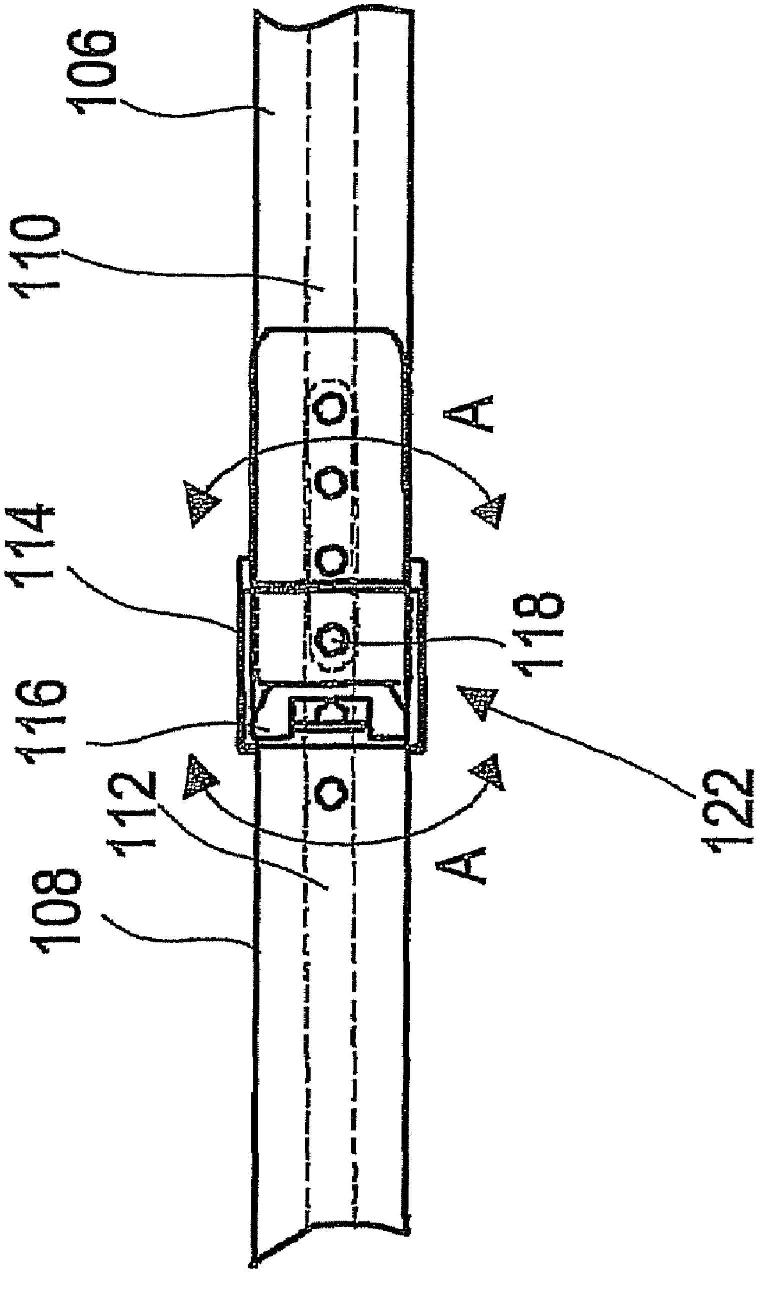
FIG. 13 is a schematic top view showing a conventional band coupling structure.

In this case, as a structure in place of the protruding locking members 72, a pair of locking plates 80 and 82 can be energized in a direction approaching each other by an energizing member such as a spring (not shown) as shown in FIG. 11.

The depressions 80*a* and 82*a* are formed in the locking plates 80 and 82, respectively, in such a manner that the depressions 80*a* and 82*a* are engaged with the engaging groove 38 of the band coupling lock pin 30. By this configuration, the locking plates 80 and 82 are locked with the engaging groove 38 of the band coupling lock pin 30.

Even in this coupling state, the depressions 80*a* and 82*a* in the locking plates 80 and 82 slide in the engaging groove 38 of the band coupling lock pin 30. Therefore, the edge 8*b* of the band 8 that is one coupling part of the band coupling section 16 and the edge 10*b* of the band 10 that is another coupling part can rotate to each other on the axis of the coupling section 16 in the width direction of the bands 8 and 10 as shown by arrows D and E in FIG. 1.

In the case in which the coupling is released, by pressing the operation button members 84 and 86 that are coupled with the locking plates 80 and 82 in a direction approaching each other, the locking plates 80 and 82 become separate from each other and the depressions 80*a* and 82*a* are detached from the engaging groove 38.

Figure 8:
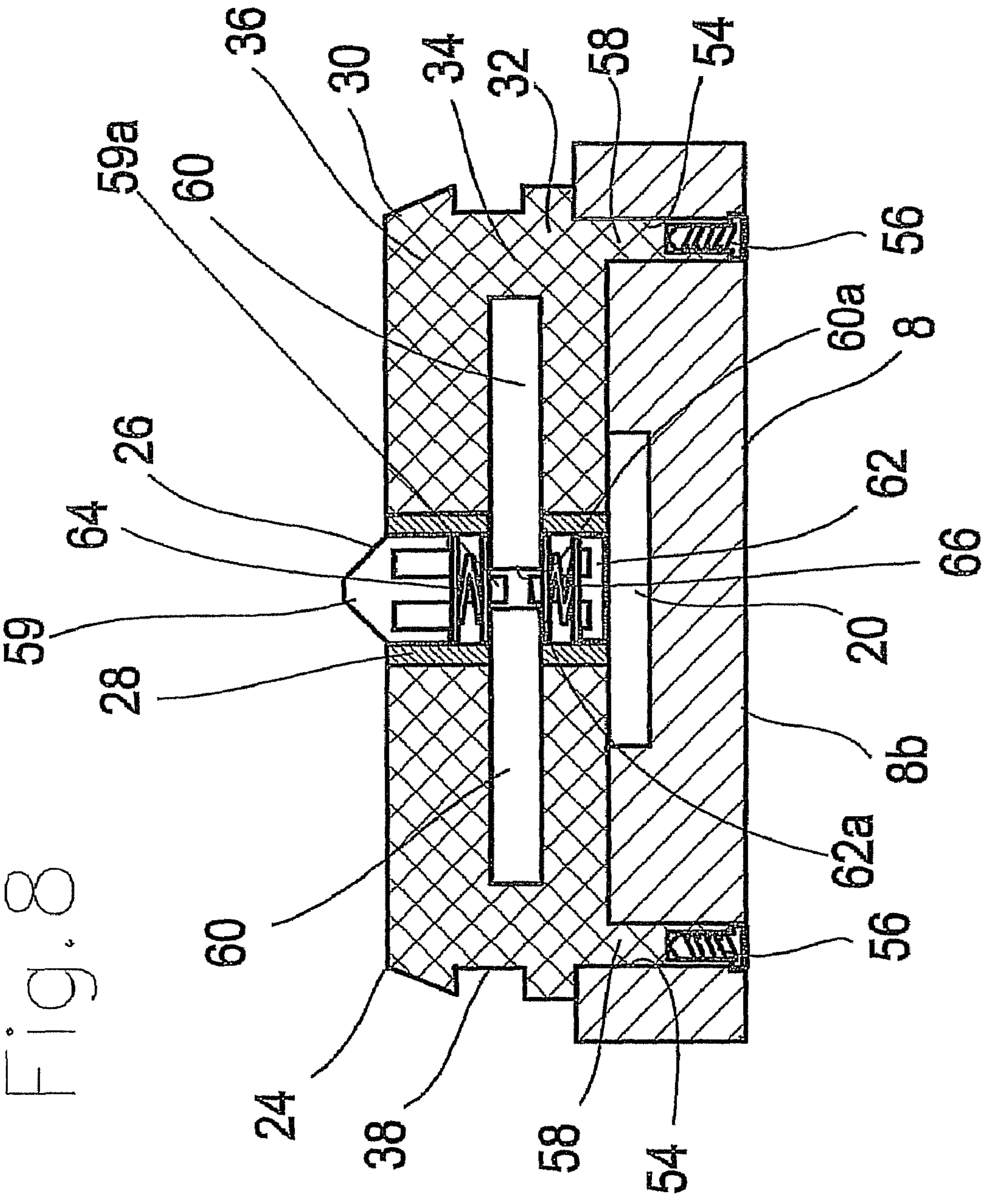
FIG. 8 is a schematic partially expanded perspective view of the edge 8*b* of the band 8, showing another embodiment of a band coupling structure of the present invention.

FIG. 8 is a schematic partially expanded perspective view of the edge 8*b* of the band 8, showing another embodiment of a band coupling structure of the present invention.

The band coupling structure 18 related to the present embodiment has the structure basically similar to the band coupling structure shown in FIGS. 5 to 7, and its elements equivalent to those shown in FIGS. 5 to 7 are numerically numbered similarly.

In the band coupling structure 18 related to the present embodiment, an energizing member 64 such as a coil spring is integrated with the upper connection pin 59 around a shaft center section 59*a* of the upper connection pin 59. Similarly, an energizing member 66 such as a coil spring is integrated with the lower connection pin 62 around a shaft center section 62*a* of the lower connection pin 62.

By the above configuration, an additional process of locating the energizing members 64 and 66 is not required in the manufacturing process, thus simplifying fabrication processes.

Figure 9:
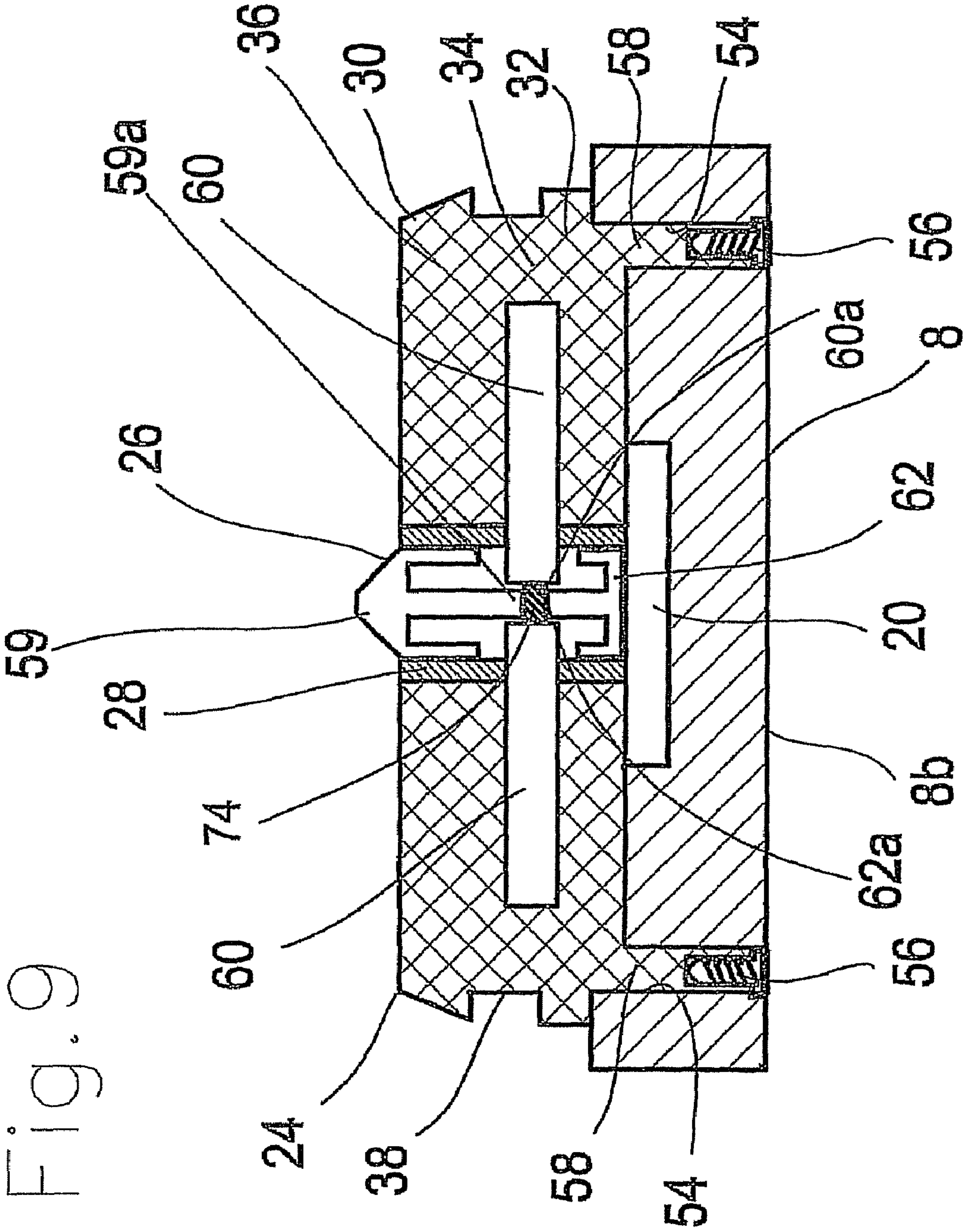
FIG. 9 is a schematic partially expanded perspective view of the edge 8*b* of the band 8, showing another embodiment of a band coupling structure of the present invention.

FIG. 9 is a schematic partially expanded perspective view of the edge 8*b* of the band 8, showing another embodiment of a band coupling structure of the present invention.

The band coupling structure 18 related to the present embodiment has the structure basically similar to the band coupling structure shown in FIGS. 5 to 7, and its elements equivalent to those shown in FIGS. 5 to 7 are numerically numbered similarly.

In the band coupling structure 18 related to the present embodiment, a conductive elastic member 74 made of a conductive elastomer member to which carbon black is blended, etc. is formed in a central hole 60*a* of the connection pin fixing member 60 as a structure in place of the energizing members 64 and 66.

The conductive elastic member 74 energizes the upper connection pin 59 upward and the lower connection pin 62 downward (in a direction of the antenna member 20).

By the above configuration, the lower connection pin 62 is abutted to the antenna member 20 incorporated in the band 8 by the energizing force of the conductive elastic member 74, thus maintaining a constant electrical contact. In the coupling state, the upper connection pin 59 is pressed downward by the antenna member 22 of the band 10. Therefore, the shaft center section 59*a* of the upper connection pin 59 is electrically connected to the shaft center section 62*a* of the lower connection pin 62 through the conductive elastic member 74.

While the preferred embodiments of the present invention have been described above, the present invention is not restricted to the embodiments. For example, while the band coupling structure incorporating conductive wires according to the present invention has been applied to the band coupling structure of a radio controlled wristwatch in the embodiments described above, the band coupling structure can also be applied to a band coupling structure incorporating conductive wires used for portable compact information terminals that receive many kinds of information by utilizing radio waves, such as a wristwatch-type pager, a portable telephone, a portable television, and a portable radio, and various changes can be thus made without departing from the scope of the present invention.

The present invention can be applied to a band coupling structure incorporating conductive wires, which is used for portable compact information terminals that receive many kinds of information by utilizing radio waves, such as a radio controlled wristwatch, a wristwatch-type pager, a portable telephone, a portable television, and a portable radio.

What is claimed is:

1. A band coupling structure incorporating conductive wires comprising:

a band coupling projection pin section formed in one coupling part of a coupling section of a band, said band coupling projection pin section comprising, a connection pin protruded upward from the band, which is electrically connected to the conductive wire, and a band coupling lock pin, which is located on the periphery of the connection pin and electrically insulated from the connection pin, and in another coupling part of the coupling section of the band, a connection pin fitting section, which is abutted by an edge portion of the connection pin, and a lock pin locking section for locking the band coupling lock pin are provided, in the case in which the band is coupled with a second band or a main body of an electric equipment, the edge portion of the connection pin is abutted to and electrically connected to the connection pin fitting section, and by locking the band coupling lock pin with the lock pin locking section, said one coupling part and said another coupling part of the band coupling section can rotate to each other on the axis of the coupling section in the width direction of the band and the second band.

2. A band coupling structure incorporating conductive wires as defined in claim 1, further comprising an abutment energizing means for energizing in the abutment direction in the case in which the edge portion of the connection pin and the connection pin fitting section are abutted to each other.

3. A band coupling structure incorporating conductive wires as defined in claim 2, wherein the abutment energizing means is an energizing means for energizing the edge portion of the connection pin in the direction abutting to the connection pin fitting section.

4. A band coupling structure incorporating conductive wires as defined in claim 2, wherein the abutment energizing means is an energizing means for energizing the connection pin fitting section in the direction abutting to the edge portion of the connection pin.

5. A band coupling structure incorporating conductive wires as defined in claim 1, wherein the connection pin and the band coupling lock pin are located coaxially.

6. A band coupling structure incorporating conductive wires as defined in claim 1, wherein an insulating member is located between the connection pin and the band coupling lock pin for electrically insulating the connection pin and the band coupling lock pin.

7. A band coupling structure incorporating conductive wires as defined in claim 1, characterized in that:

an engaging groove is formed on the side of the band coupling lock pin; and a locking projection is formed in the lock pin locking section; and the band coupling lock pin can be detachably locked with the lock pin locking section by fitting the locking projection into the engaging groove.

8. A band coupling structure incorporating conductive wires as defined in claim 1, wherein the band coupling projection pin section formed in said one coupling part of the coupling section of the band immovable in a longitudinal direction of the band.

9. A band coupling structure incorporating conductive wires as defined in claim 1, wherein the band coupling structure is a band link structure for coupling the edges of the band and the second band with each other.

10. A band coupling structure incorporating conductive wires as defined in claim 1, wherein the band coupling structure is a band coupling structure for coupling the edge of the band and an apparatus that uses a conductive wire being coupled with the band.

* * * * *

UNITED STATES PATENT AND TRADEMARK OFFICE

CERTIFICATE OF CORRECTION

PATENT NO. : 7,397,437 B2

APPLICATION NO. : 11/390694

DATED : July 8, 2008

INVENTOR(S) : Yuichi Hasumi et al.

It is certified that error appears in the above-identified patent and that said Letters Patent is hereby corrected as shown below:

Column 14, Line 42, Claim 8, “band immovable” should read -- band is movable --

Signed and Sealed this

Second Day of December, 2008

JON W. DUDAS

*Director of the United States Patent and Trademark Office*